United States Patent
Wall

(10) Patent No.: US 7,043,361 B1
(45) Date of Patent: May 9, 2006

(54) METHOD AND APPARATUS FOR CALCULATING GEOMETRY OF A MOVING HAVEN

(75) Inventor: Mathew D. Wall, Barboursville, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 187 days.

(21) Appl. No.: 10/724,308

(22) Filed: Nov. 26, 2003

(51) Int. Cl.
*G01C 21/30* (2006.01)

(52) U.S. Cl. .................. 701/211; 701/200; 701/201; 701/202; 701/207; 340/988; 340/995.19

(58) Field of Classification Search .............. 701/200, 701/201, 202, 207, 208, 211; 340/988, 990, 340/995.19
See application file for complete search history.

(56) References Cited

U.S. PATENT DOCUMENTS 5,986,575 A * 11/1999 Jones et al. ................. 340/906
6,243,026 B1 * 6/2001 Jones et al. ................. 340/906

\* cited by examiner

*Primary Examiner*—Gertrude A. Jeanglaude
(74) *Attorney, Agent, or Firm*—Seymour Levine

(57) ABSTRACT

Boundaries of a moving haven along a voyage plan are constructed with the utilization of simple shapes, rectangles and arcs, each of which are drawn with selected line segments. A buffer, internal to the moving haven boundary, is created, which, when crossed initiates a warning that the boundary of the moving haven is being approached. Procedures for the implementation of the moving haven boundary and the buffer are substantially similar, with but few modification from the procedure that generates the moving haven needed to establish the procedure to implement the procedure that generates the buffer.

20 Claims, 9 Drawing Sheets

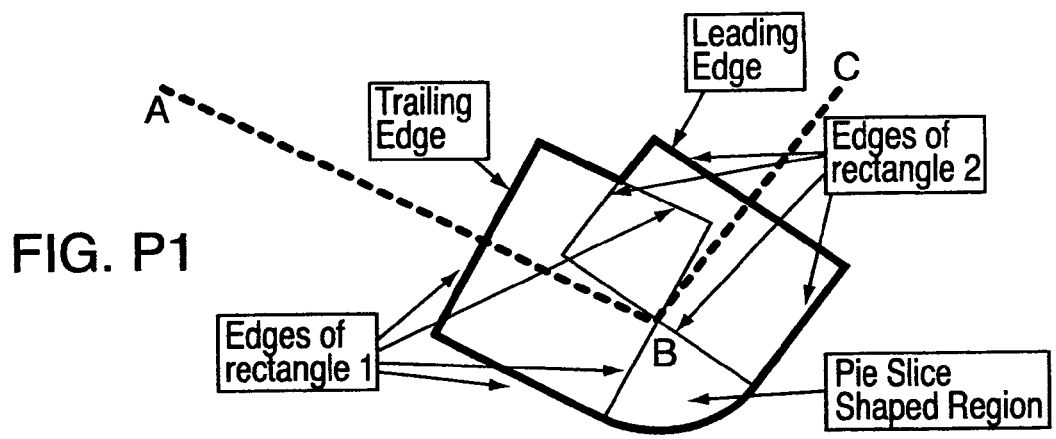
FIG. P1
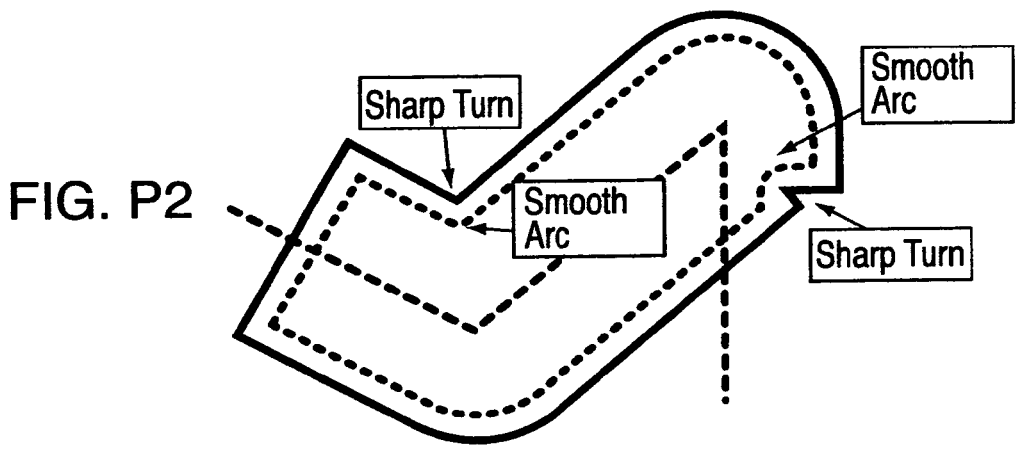
FIG. P2
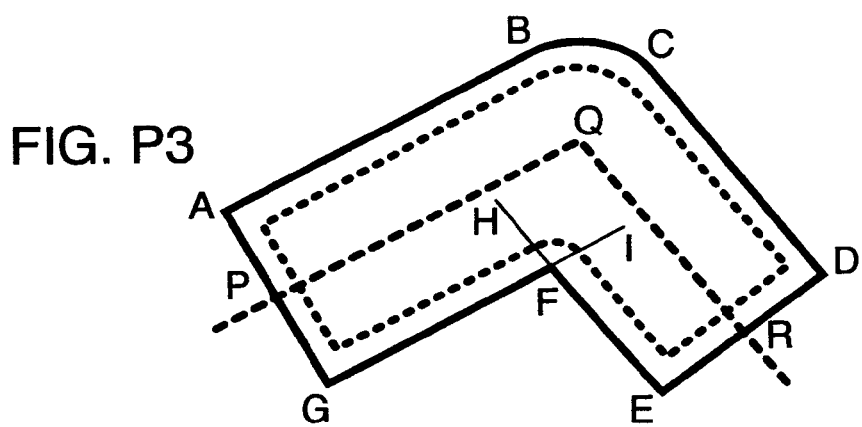
FIG. P3

FIG. P4
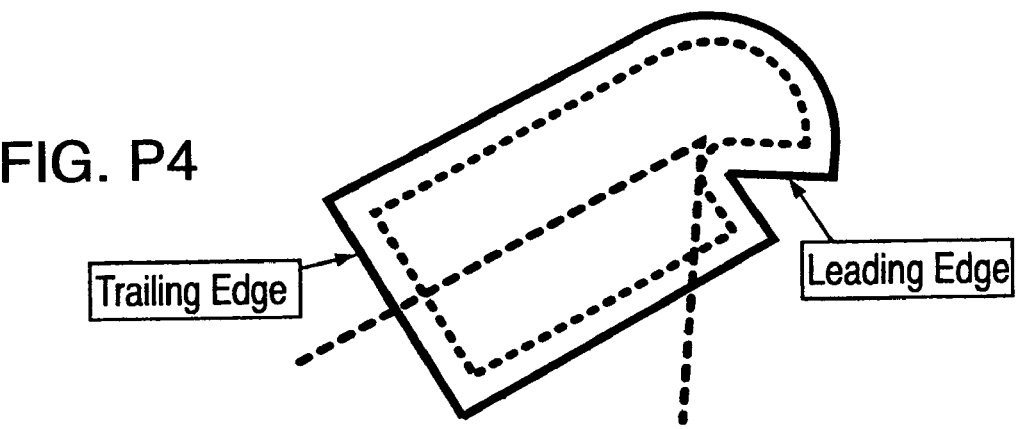
FIG. P5
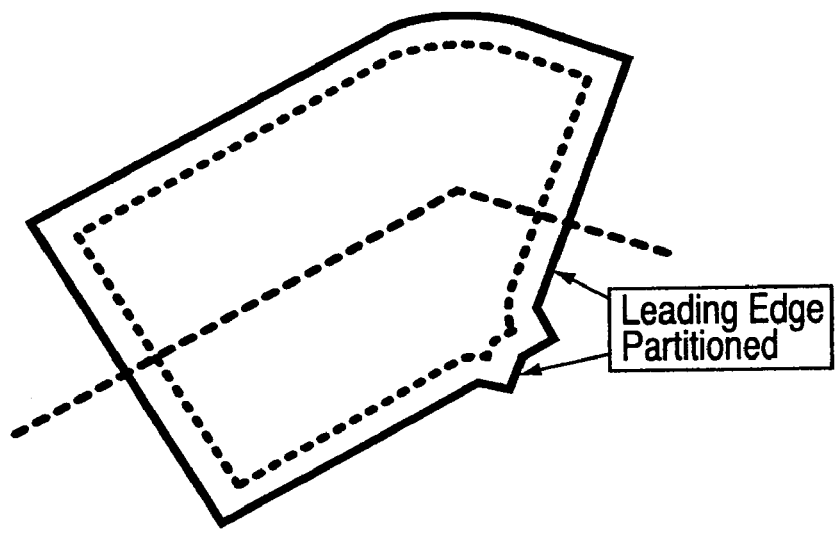
FIG. P6
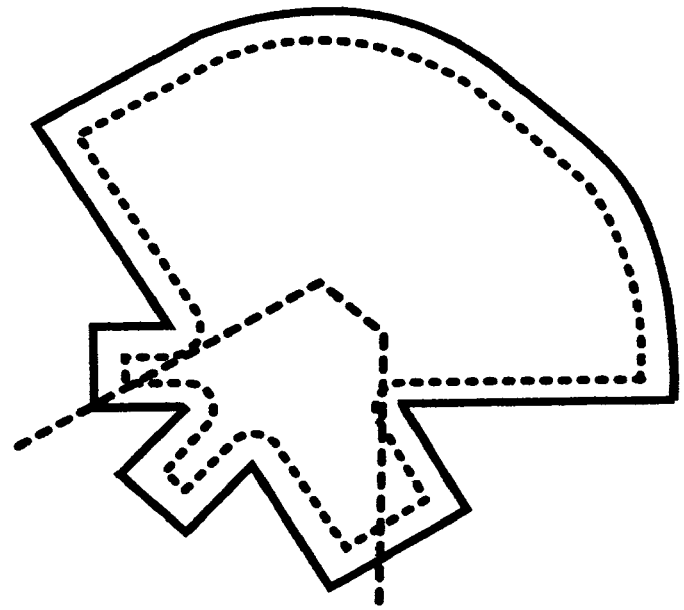

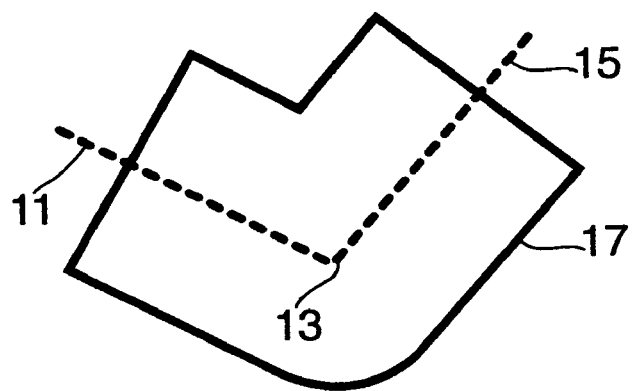
FIG. 1A
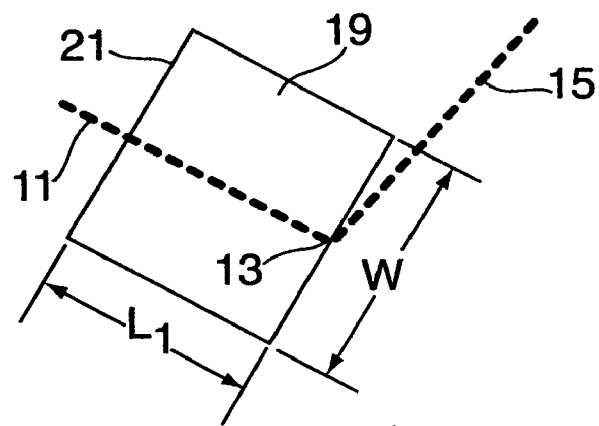
FIG. 1B
FIG. 1C
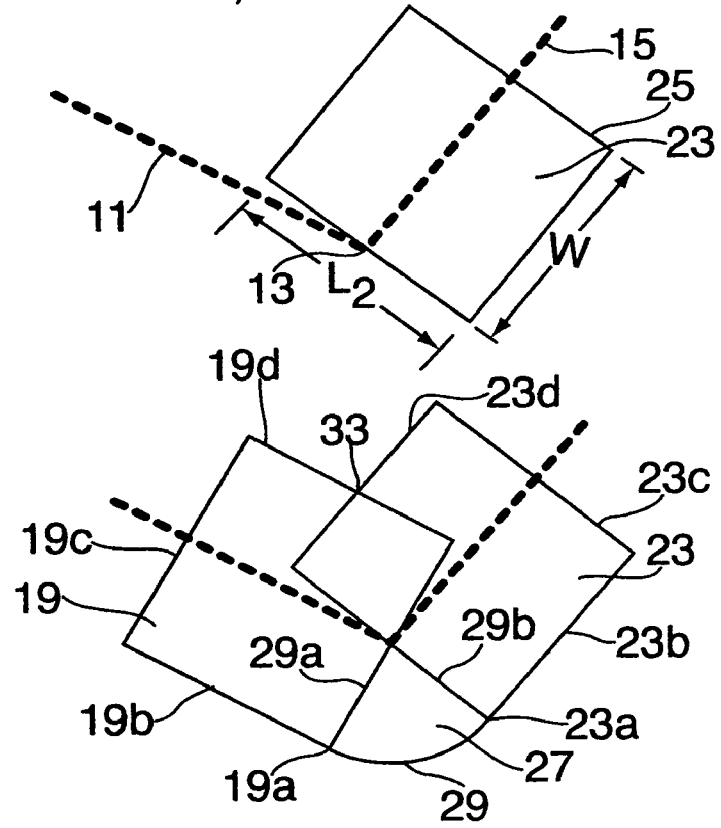
FIG. 1D

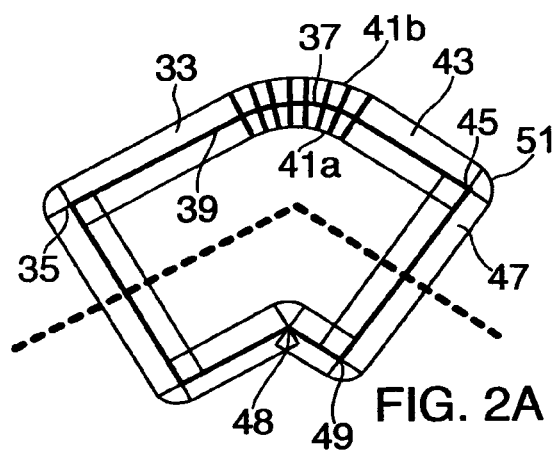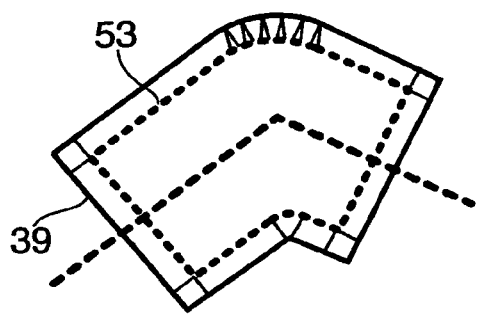
FIG. 2A  FIG. 2B
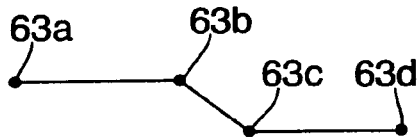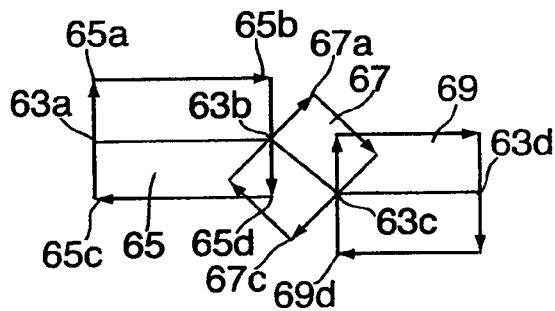
FIG. 4A  FIG. 4B
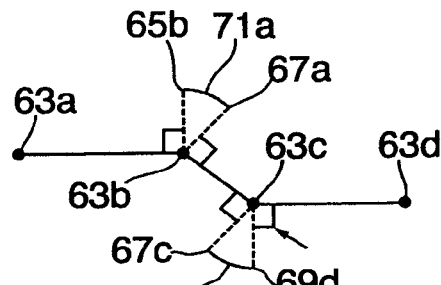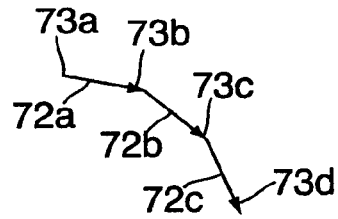
FIG. 5A  FIG. 5B

METHOD AND APPARATUS FOR CALCULATING GEOMETRY OF A MOVING HAVEN

BACKGROUND OF THE INVENTION

1. Field of the Invention

The invention pertains to the field of marine navigation and more particularly to the calculation of the geometry of a moving haven along a navigation path.

2. Description of the Prior Art

A moving haven is a mechanism used in marine navigation to manage the voyages of marine vessels. A moving haven is generally a three-dimensional region which moves along a predefined path, a voyage plan. A vessel using a moving haven for navigation may move freely within the region, but may not go outside its boundaries.

The calculation of the geometry of the moving haven presents some difficult challenges due to the subtle variations of its shape for small changes in the parameters that define it. Prior solutions focused on drawing the moving haven in its more common manifestations and required special case logic to handle variations from the norm. Special case logic makes software more complicated, and it is difficult to make complex software work correctly. Furthermore, it is difficult to identify all the special cases, so some are inevitably missed.

A moving haven is a two dimensional region that moves through the ocean. A ship may not cross outside the moving haven boundary, but is allowed to operate within it freely.

A moving haven, in its simplest manifestation, is a rectangle. As it progresses through the water, it follows a predefined path, which is called a voyage plan, defined by a series of waypoints connected by legs. A rectangular buffer, the sides of which are a predetermined distance from the corresponding sides of the rectangle, provides an early warning to the navigator that the ship is approaching the edge of the moving haven.

As the name implies, the moving haven is in motion. When it approaches a waypoint it must turn from one leg to the next. When a rectangular moving haven spans a waypoint, the region that the moving haven encompasses generally includes the area of two overlapping rectangles and one pie slice shaped region, as shown in Figure P1. The first rectangle is defined around the line segment starting at the intersection of the trailing edge and voyage plan leg AB and ending at waypoint B. The second rectangle is defined around the line segment starting at waypoint B and ending at the intersection of the leading edge and the voyage plan leg BC. The pie slice shaped region, having an arc center at B, fills in the gap between the two rectangles.

Determining the geometry for the moving haven boundary must be accompanied by the determination of the geometry of the moving haven buffer. The moving haven buffer must be drawn so that each point on the buffer is exactly a predetermined distance from at least one point on the moving haven boundary, and no closer than the predetermined distance to any point on the moving haven boundary. It would be expected that the boundary has the same shape of the moving haven, but drawn smaller. This, however, is not the case. Often, when the moving haven has a sharp turn, the buffer requires a smooth curve, as shown in Figure P2.

Calculating the geometry of the moving haven boundary and its buffer is a difficult problem that has challenged engineers for years. The difficulties are a result of A) the moving haven often taking form of a variety of shapes and B) the fact that the buffer and boundary are not proportional, e.g. the buffer is, not simply a smaller rendition of the boundary.

Past attempts to determine the moving haven geometry have resulted in only marginal success, partially do to the following:

A) The problem was not decomposed adequately into smaller more manageable sub-problems.

B) Special case logic was required to handle irregular geometries.

C) No single solution was found to solve both the boundary problem and the buffer problem.

Past solutions have constructed the moving haven geometry sequentially, starting at some vertex on the boundary (or buffer) and working either clockwise or counter clockwise, determining subsequent vertices in the order that they appear in the final geometry. Such solutions also attempted to construct the boundary directly from the voyage plan geometry, rather than constructing intermediate results, and then making further refinements to arrive at the final geometry. The following is an example of a method that calculates the geometry sequentially.

Refer to Figure P3, assume P is the intersection of the trailing edge and the first leg, Q is the waypoint that the moving haven spans, and R is the intersection of the leading edge and the second leg. The moving haven boundary is shown with dark solid lines. The buffer is shown with a dotted line.

1) Point A is found by adding to point P a vector perpendicular to PQ of length equal to half the width of the moving haven.

2) Point B is found by adding to point Q a vector perpendicular to PQ of length equal to half the width of the moving haven.

3) Points are calculated to form an arc between B and C. The arc has a radius equal to half the width of the moving haven.

4) Point C is found by adding to point Q a vector perpendicular to QR of length equal to the half width of the moving haven.

5) Point D and E and found in a similar fashion.

6) A temporary line EH is found by shifting QR in a direction perpendicular to QR a distance equal to half of the moving haven width. A temporary line GI is found by shifting PQ in a direction perpendicular to PQ a distance equal to the half of the moving haven width. Point F is the intersection of these two lines.

7) Point G is found in a way similar to point A.

Notice that the steps outlined above are very specific to calculating a moving haven spanning a single waypoint as shown in FIG. 5. Because the steps are specific to this particular scenario, a modification to these steps is required if the scenario changes in subtle ways. Furthermore, additional logic is required to detect that the scenario has changed. The following illustrates a few alternate scenarios and the difficulties these variations introduce.

As with the moving haven in Figure P3, the moving haven in Figure P4 spans a single waypoint. But this scenario differs in that the leading edge has just past a waypoint. As a result, the leading edge is not drawn in full. A portion of the leading edge is clipped by the area of the moving haven drawn around the first leg. Because the steps outlined above provide no provision for the leading edge being clipped, special case logic is required to detect this situation and account for its differences appropriately.

Figure P5 shows yet another scenario that requires special case logic. In this case, the leading edge is partitioned into two sections, because it intersects a portion of the moving haven that spans the first leg.

The above examples demonstrate the need for special case logic when the moving haven spans a single waypoint. It may be possible to identify and handle all special cases for the single waypoint situation, but the number of special cases becomes unmanageable when the moving haven spans two or more waypoints. As shown in Figure P6, the moving haven geometry can become quite complex when spanning as few as two waypoints. Determining the special case logic to calculate the boundary geometry for this shape directly from the voyage plan is difficult and likely to be error prone.

The above discussion focused on the difficulties in drawing the moving haven boundary. Calculating the moving haven buffer suffers from these and additional difficulties, making buffer problem harder to solve.

Prior art software fails, in many situations, to calculate the boundary and buffer geometries for the following reasons:
A) Prior art solutions did not adequately divide the problem into small simple sub-solutions, attempting to solve the entire problem at once. These programs attempted to calculate the final geometry directly from the voyage plan geometry.
B) Special case logic was required for handling variations in the voyage plan geometry.
C) Two separate methods were required for calculating the boundary and the buffer, resulting in more opportunities for errors to be introduced.

SUMMARY OF THE INVENTION

In accordance with the present invention, a process utilizing simple shapes, such as rectangles and arcs, is employed for calculating the moving haven geometry. This process builds the complicated moving haven geometry with the shapes and succeeds where the prior art failed because:
A) It decomposes the problem into smaller simpler sub-problems and
B) The approach is designed to handle all moving haven manifestations without special case logic.

The simple shapes method has the following characteristics:
A. The problem is subdivided into smaller simpler sub-problems.
B. No special case logic is required for the various manifestations of the moving haven. In other words, the same sequence of steps is used regardless of the geometry.
C. The method used to calculate the moving haven boundary is also used to calculate the buffer.

The desired end result is an ordered list of points that define the vertices of the moving haven boundary. This is accomplished by providing software that is free to subdivide the original problem into simpler sub-problems. Instead of focusing on the determination of the line that forms the boundary (and buffer) of the moving haven, the simple shapes method constructs a composite region that the moving haven defines. The region is always the union of one or more rectangles and zero or more pie slice shaped areas. This leads to the first two sub problems that must be solved:
A) Calculate the rectangles around each line segment of the input polygonal line. For calculating the moving haven boundary, the input polygonal line is the portion of the voyage plan spanned by the moving haven.
B) Calculate the pie slice shaped areas that complete the definition of the moving haven.

C) Find the boundary of the region that forms the union of the set of intersecting rectangles and pie slice shaped regions.

The solution of these sub-problems is relatively straightforward, the details of which will be discussed subsequently.

Various subtleties must be addressed to make the method work in practice. These three steps, however, form the essence of the method. Steps A and B are relatively simple. Step C is somewhat more involved.

The invention will be better understood by the description of the preferred embodiments with reference to the drawings.

BRIEF DESCRIPTION OF THE DRAWINGS

FIG. P1 is an illustration of a moving haven split into multiple smaller rectangles.

FIG. P2 is a comparison of a moving haven boundary and its buffer.

FIG. P3 is an illustration of a moving haven spanning a vertex.

FIG. P4 is an illustration of a moving haven just starting on a second leg.

FIG. P5 is an illustration of a moving haven with its leading edge partitioned into two separate line segments.

FIG. P6 is an illustration of a moving haven spanning two waypoints.

FIG. 1A is an illustration of a moving haven spanning a waypoint useful for explaining its decomposition into simple shapes.

FIG. 1B is an illustration of a rectangle drawn along the first leg spanned by the moving haven of FIG. 1A.

FIG. 1C is an illustration of a rectangle drawn along the second leg of the moving haven of FIG. 1A.

FIG. 1D is a combination of the basic shapes that form the moving haven of FIG. 1A.

FIG. 2A is a representation of rectangles and arcs generated for establishing a moving haven buffer.

FIG. 2B is an illustration of a buffer formed by the rectangles and arcs of FIG. 2A.

Figure 3:
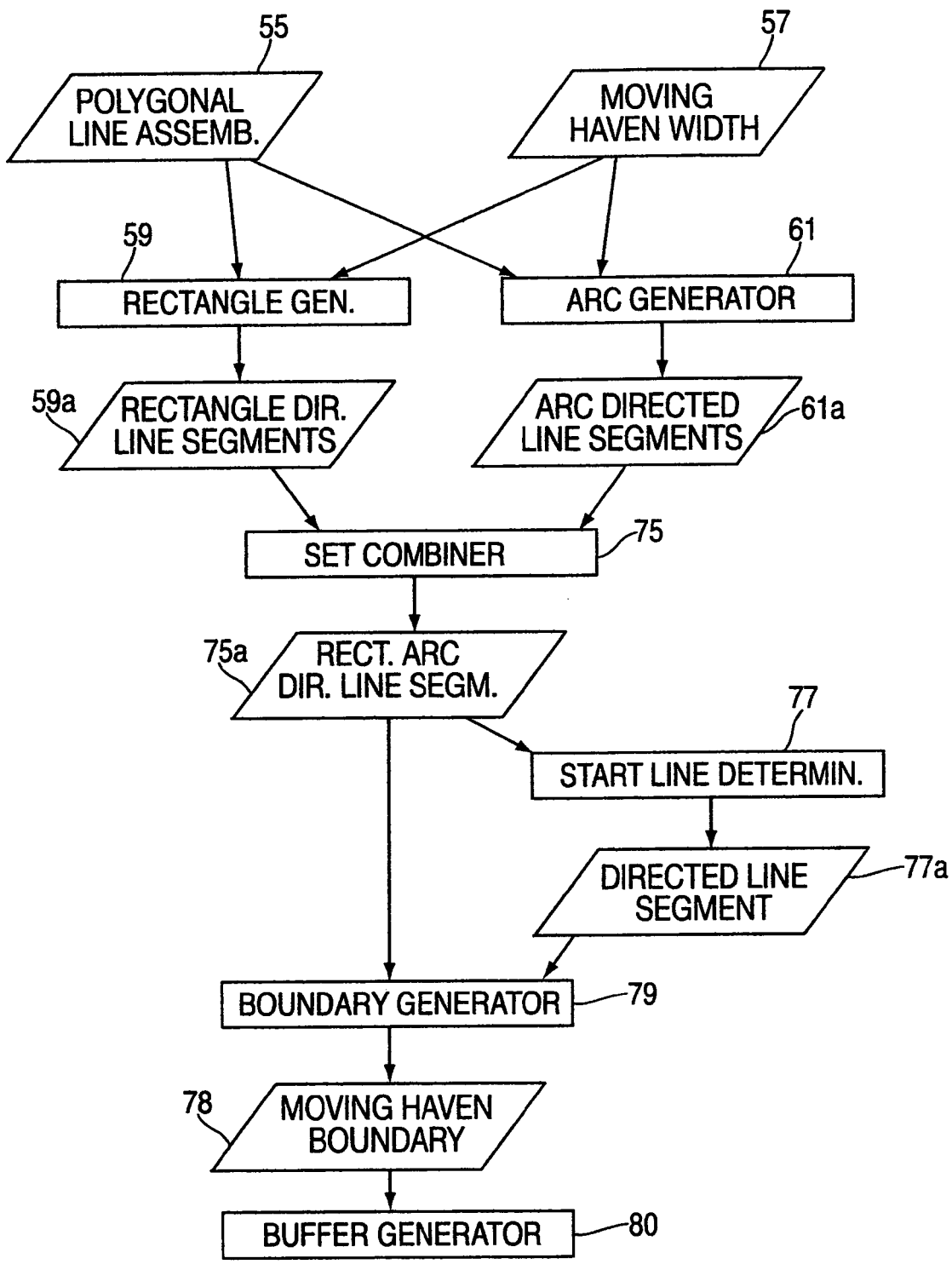

FIG. 3 is a flow chart for determining a moving haven

FIG. 4A is a representation of a portion of voyage plan about which a moving haven is to be drawn.

FIG. 4B is representation of rectangles drawn about the portion of the voyage plan of FIG. 4A.

FIG. 5A is an illustration of arc generations for a moving haven boundary.

FIG. 5B is an illustration of a line segment approximation of an arc.

Figure 6:
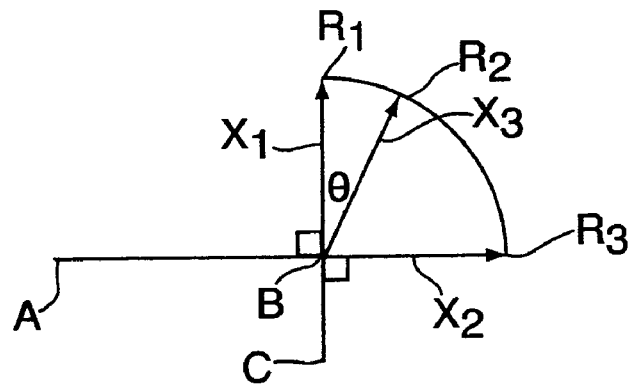

FIG. 6 is an illustration of a process for determining the arc segments of FIG. 5B.

Figure 7:
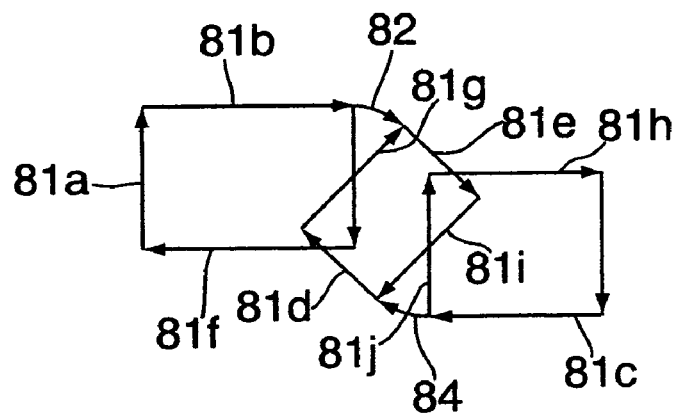

FIG. 7 is a vector diagram useful for explaining the start line determination step.

Figure 8A:
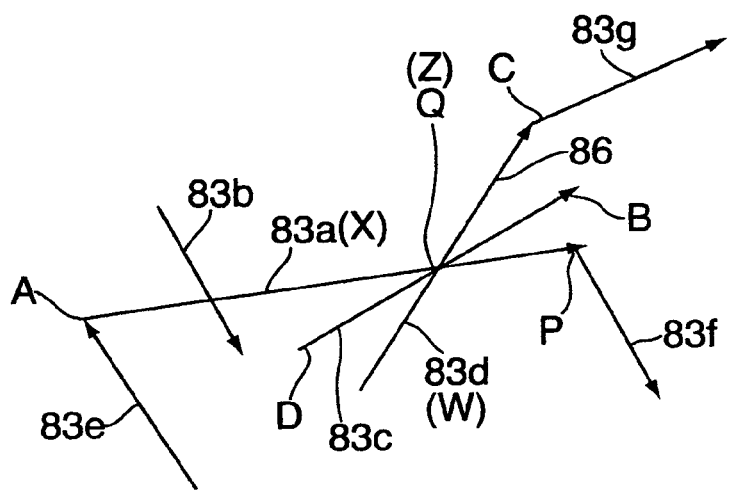

FIG. 8A is a set of vectors useful for explaining the creation of a polygonal line.

Figure 8B:
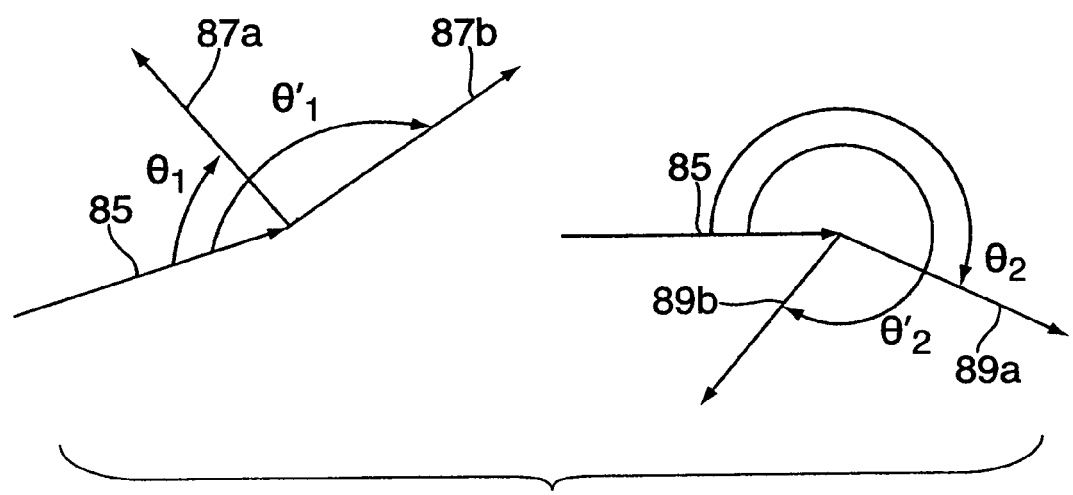

FIG. 8B is a vector diagram useful for explaining the determination of counter-clock wise and clock wise turns.

Figure 8C:
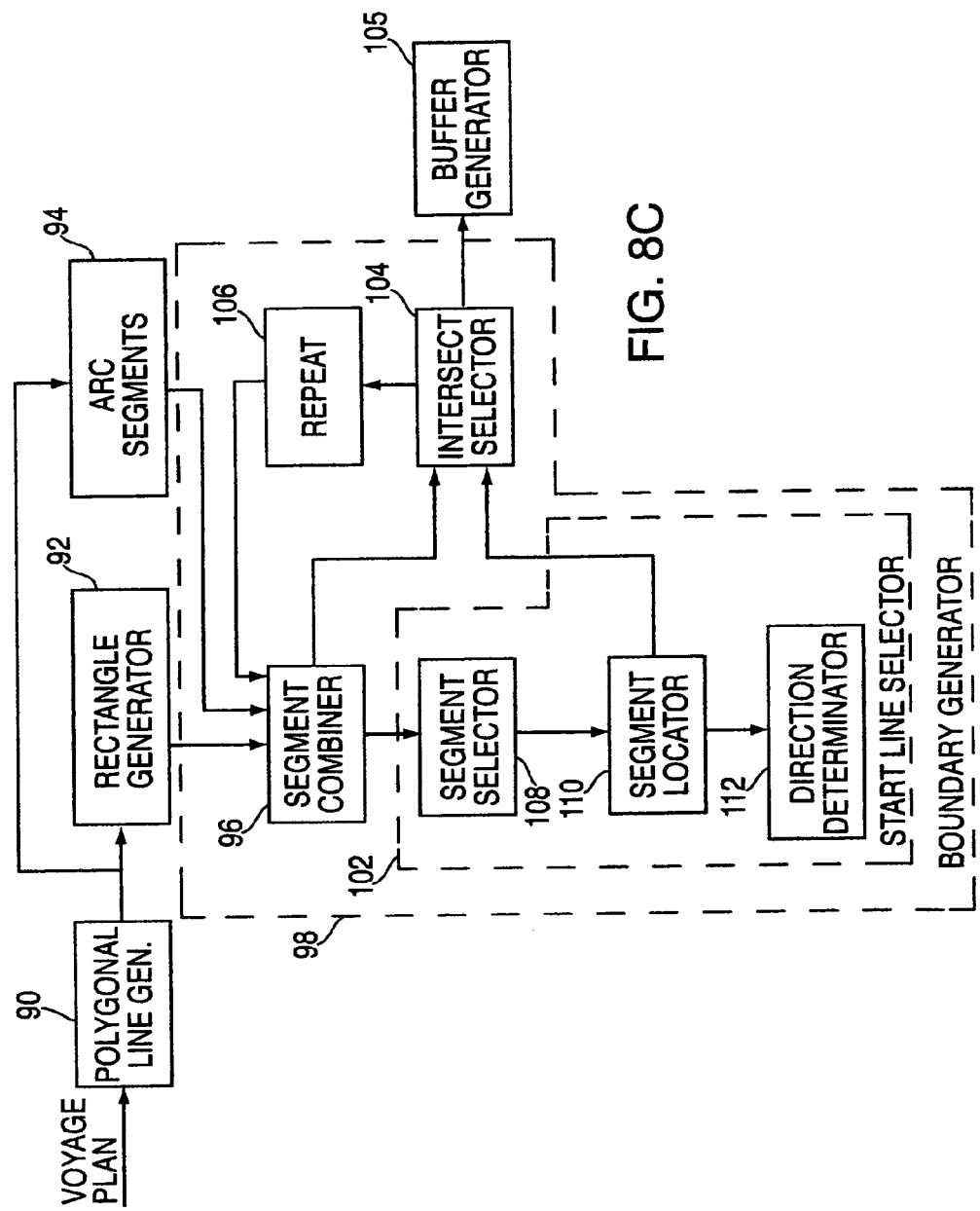

FIG. 8C is a block diagram of an apparatus for generating a moving haven boundary.

Figure 9:
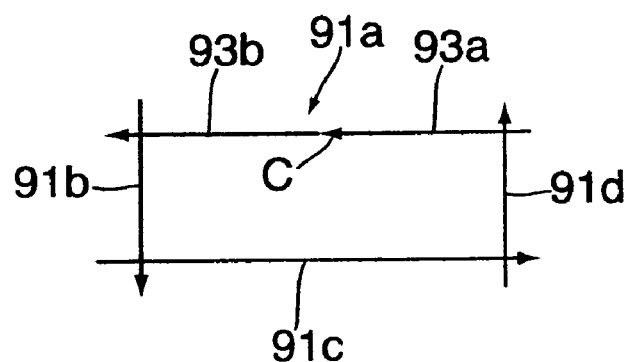

FIG. 9 is a set of line segments useful for explaining a method for determining a start segment for generating a buffer boundary.

Figure 10:
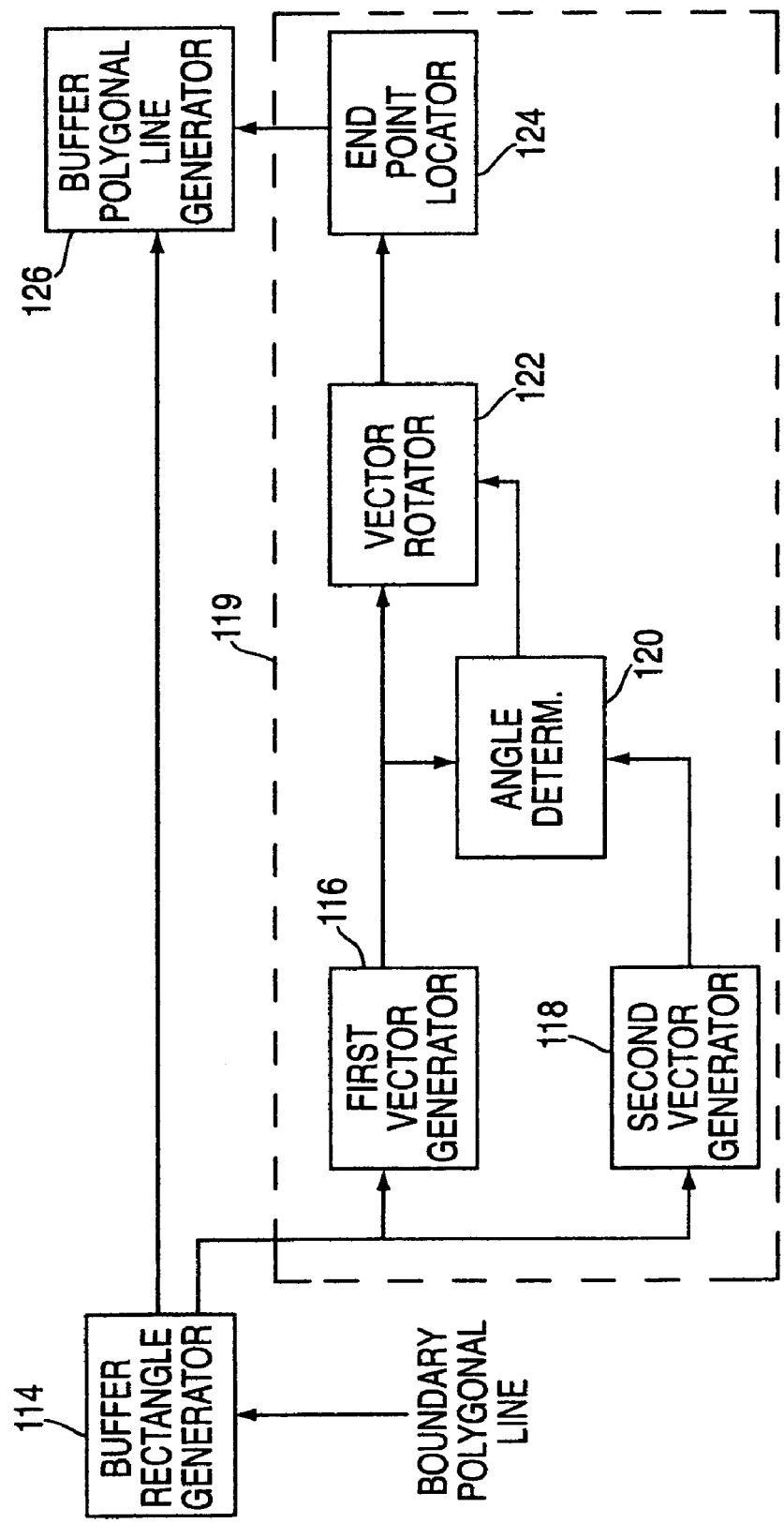

FIG. 10 is a block diagram of an apparatus that may be utilized for the buffer generator of FIG. 8C.

DESCRIPTION OF THE PREFERRED EMBODIMENTS

In the figures elements mentioned in a figure and appear in subsequent figures bare the same reference numerals.

Refer now to FIG. 1A, wherein a moving haven is shown to proceed along a first leg 11 to a waypoint 13 and then along a second leg 15, forming a boundary 17. To calculate the moving haven a first rectangle 19 is drawn as shown in FIG. 1B. This rectangle has a width W equal to the width of the moving haven and a length L, which starts at the trailing edge 21 of the moving haven and extends to the way point 13. A second rectangle 23 is drawn as shown FIG. 1C. This rectangle has the width W and a length $L_2$ which starts at the waypoint 13 and extends to the leading edge 25. The rectangles 19 and 23 respectively positioned along the first and second legs establish a gap 27, shown in FIG. 1D, on the boundary of the moving haven. This boundary gap 27 is closed by drawing an arc 29 from the corner 19a of the rectangle 19 to the corner 23a of the rectangle 23, thus forming a pie slice having sides 29a and 29b. The boundary 17, shown in FIG. 1A, of the moving haven comprises the sides 19b and 19c of the rectangle 19, sides 23b and 23c of the rectangle 23, sections 19d and 23d of sides of the rectangles 19 and 23, which respectively extend from intersection 33 to the sides 19c and 23c, and the arc 29.

Two of the three criteria identified as requirements for success have been discussed. First, the problem is subdivided into smaller simpler sub-problems, Second, the problem avoids special case logic in that the orientation and relationship of the intermediate shapes is inconsequential since any arbitrary combination of adjoining rectangles and pie slice shaped areas may be combined.

As mentioned above, the method should be general enough to solve the buffer geometry problem as well. The polygon of the buffer may be determined if the method's input parameters are changed. For the moving haven, the input parameters include the portion of the voyage plan spanned by the moving haven and a value specifying the moving haven width. To determine the interior buffer, the input polygon is the polygon that defines the moving haven boundary, rather than a portion of the voyage plan. The value used for the width of the rectangle that is moved along the boundary is twice the buffer width, rather than the moving haven width.

As previously stated, the first step of the process is to generate rectangles around each line segment and pie slice shaped areas for each vertex. The application of this step results in the rectangles and pie slice shaped regions shown in FIG. 2A. A first rectangle 33 is centered on the moving haven boundary, having a width that is twice the width of the buffer and a length equal to the distance between a first corner 35 of the moving haven boundary 39 and the start of an arc section 37. As will be explained subsequently, an internal arc 41a and external arc 41b are drawn for the duration of boundary arc section 37 and a second rectangle 43 is drawn from the end of the arc section 37 to a second corner 45 of the moving haven boundary 39. A third rectangle 47 is drawn between the second corner 45 and a third corner 49 of the moving haven boundary 39 and an arc 51 is drawn as previously discussed. This process continues about the boundary of the moving haven until the entire moving haven boundary has been traversed. The composite region drawn at the completion of the buffer geometry has interior and exterior edges. Since the buffer may not extend beyond the moving haven the interior edge 53, shown in FIG. 2B wherein the result of the process is shown, is the edge of interest.

Refer now to FIG. 3, wherein a data flow diagram for the simple shapes process is shown. An ordered list of points representing a polygonal line (a portion of the voyage plan spanned by the moving haven) is assembled 55 and the width of the moving haven 57 are coupled to a rectangle generator 59 and an arc generator 61. The rectangle generator 59 provides sets of directed line segments representing rectangles, each set establishing a rectangle having the width of the moving haven around each of the line segments of the polygonal line. Refer now to FIGS. 4A and 4B. Consider a portion of a voyage plan having an origin 63a, two waypoints 63b and 63c, and an end point 63d. A first rectangle 65 is drawn between the origin 63a and the first waypoint 63b, a second rectangle 67 is drawn between the waypoints 63b and 63c, and a third rectangle 69 is drawn between the second waypoint 63c and the end point 63d. A first vertex 65a of the rectangle 65 is found by offsetting a distance of one half the moving haven width from the origin 63a, in a direction perpendicular to the segment between the origin 63a and the first waypoint 63b. The remaining vertices for the rectangle 65 are found in a similar fashion. The vertices of the rectangles 67 and 69 are determined in a same manner as the vertices of rectangle 65, the distances being measured on lines drawn perpendicular to the line segments between the waypoints 63b and 63c and the waypoint 63c and the end point 63d, respectively.

Line segments provided at the output 59a of the rectangle generator 59 must be constructed properly for use when the moving haven is established, which will be discussed subsequently. Establishment of the moving haven requires a set of directed line segments. The order of the line segments within the set is not important, but the direction of the line segments is critical. Each line segment must be constructed so that the line segments that define a rectangle, point in a clockwise direction. For example, the arrows which show the direction of the line segments for the rectangle 65 are collectively pointing in a clockwise direction. The same is true for the rectangles 67 and 69.

Refer to FIGS. 3, 4A, and 5A. The ordered list of points representing the polygonal line from the polygonal line assembly 55 and the width provided from moving haven width 57 are coupled to arc generator 61 wherein arcs are generated with a specified radius for each point on the input polygonal line requiring an arc segment. At each of these points, the arc is generated around the obtuse angle formed by the intersecting line segments. To complete the moving haven for the polygonal line shown in FIG. 4A, an arc 71a must extend from the vertex 65b of rectangle 65 to the vertex 67a of the rectangle 67 and an arc 71b must extend from the vertex 67c of the rectangle 67 to the vertex 69d of the rectangle 69.

These arcs may be approximated by a series of directed line segments. As shown in FIG. 5B three directed lines may be chosen to approximate the arc, a line segment 72a from point 73a to point 73b, a line segment 72b from point 73b to point 73c, and a line segment 72c from point 73c to point 73d. Just as with the generation of rectangles, the line segments representing the arc should be generated in a clockwise direction.

In the above illustration, line segments 72a, 72b, and 72c approximate the arc. These line segments form a clockwise rotation along the circle that defines the arc. Though only three line segments were used to illustrate the arc approximation, it should be understood that a greater number of line segments may be used to yield a smoother curve.

The following steps may be applied to approximate an arc about a vertex of an input polygonal line ABC, shown in FIG. 6.

1. A vector $X_1$ that connects the vertex to the beginning of the arc is determined. This will be a vector with a length equal to the specified radius, starting from vertex B, and perpendicular to AB.
2. A vector $X_2$ that connects the vertex B to the end of the arc is determined. This will be a vector with a length equal to the specified radius, starting from vertex B, and perpendicular to BC.
3. Add the point $R_1$ at the end of vector $X_1$ to an ordered list of points.
4. Rotate $X_1$ by an angle $\theta$ to establish a vector $X_3$. Smaller values of $\theta$ will result in a better approximation of the arc. If the total angle between the vector $X_3$ and the start vector $X_1$ is less than the angle between the end vector and the start vector, add the point at the end of the vector $X_3$ to the ordered list.
5. If the total angle between $X_3$ and the start vector $X_1$ is less than the angle between the end vector and the start vector, repeat step 4 rotating the vector $X_3$ through the angle $\theta$ and adding the point at end of the rotated vector to the list. Otherwise proceed to step 6.
6. Add the point $R_3$ at the end of the end vector $X_2$ to the list.

If $\theta$ was set to 30 degrees for the arc shown in FIG. 6, the process would generate the 4 points (73a, 73b, 73c, and 73d) shown in FIG. 5B to define the arc shown in FIG. 6. The final output of this step of the method would be the line segments 72a, 72b, and 72c which connect these points.

Arc representative line segments provided at the output 61a of the arc generator 61 are vectors, like the vectors representative of the rectangles, are oriented in a clockwise direction. This set of line segments and the set of line segments for the formation of the rectangles are combined in a combine sets step 75. The resulting set of combined line segments sets are provided at output 75a of set combiner 75 and coupled therefrom to a start line segment determinator 77.

Before the boundary of the moving haven 78 can be established by a moving haven boundary generator 79, a starting line segment must be specified. The boundary determinator 79 receives the combined line segments from the output 75a of the combined sets step 75 and a starting line designated by the start line determinator 77. Establishment of a correct moving haven boundary requires a starting line segment which is on and has its beginning on the moving haven boundary. Referring to FIG. 7, line segments 81a, 81b, 81c, having the entire segment on the boundary, and line segments 81d, 81e, having the beginnings on the boundary, are acceptable; while 81f, 81g, 81h, 81i, although having portions and their ends on the boundary, their beginnings are within the boundary, and are therefore, not acceptable. Line segment 81j is not acceptable, it is entirely within the boundary. The segments that approximate the arcs 82 and 84 are all acceptable.

The following heuristic may be used to find an appropriate starting line segment:

I. Let R be the set of all segments that have start points that are at least as far left as all other points. Segments that meet this criteria would be 81a and 81b.

2. If R contains only one segment, then this is the start segment.

3. If R contains more than one segment, then select the line segment in R that points the most upward. Since segment 81a points more upward than 81b, it is selected.

The boundary generator 79 (FIG. 3) requires that the intersection of two segments to be classified as either clockwise of counter-clockwise. Refer to FIG. 8B, wherein clockwise and counter-clockwise turns are illustrated. A turn from vector 85 to 87a requires a counter-clock wise movement. The angle $\theta_1$, from the vector 85 to the vector 87a is less than 180°, as is the angle $\theta'_1$, the angle from the vector 85 to the vector 87b, which also requires a counter-clock wise turn for the vector transition. It should be apparent that all counter-clock wise turns will have angles that are less than 180° between the transition vectors. A turn from vector 85 to vector 89a is a clockwise turn and the angle $\theta_2$ from vector 85 to vector 89a is less than 180°, as the angle $\theta'_2$, the angle between the vector 85 and 89b, which requires a clock wise turn for the vector transition. It should also be apparent that all clock wise turns will have angles between transition vectors that are greater than 180°.

To illustrate the operation of the boundary generator 79 (FIG. 3), refer to FIG. 8A. Assume segment 83a, with a beginning point A and an ending point B, is a starting segment for a polygonal line. To complete the polygonal line the following procedure may be employed with reference to FIG. 8A:

1. Add the beginning point A of the segment 83a to an ordered list L, which will be the list of points that define the final polygonal line.
2. Set the current segment 83a to be the starting segment. Call 83a X.
3. Look for intersections between X and any other segment. In FIG. 8A, the segment X intersects 83b, 83c, 83d, 83e, and 83f. Call this list of segments the candidate set of segments, named S.
4. Drop all segments from the set S whose end point touches the starting point of the starting segment X. This eliminates segment 83e.
5. Drop all segments from the set S that result in a clockwise turn, unless that segment intersects X at the end point B. This eliminates 83b, but not 83f.
6. For each of the remaining line segments in S, find where those segments intersect X. Only segments 83c, 83d, and 83f remain in S. Call the point at which 83c intersects X, point Q. Notice that 83d also intersects X at Q. Call the point that 83f intersects X, point P. Of the intersection points, find the one that is closest to the start point A of X. In FIG. 8A, Q is closest to A. Drop all line segments that do not include this closest intersection point. This removes 83f from S, leaving only 83c and 83d.
7. If S is empty then terminate the process.
8. Of the remaining segments in S, select the one that results in the smallest angle $\theta$, where $\theta$ is measured as shown in FIG. 8B. Call the selected segment W. In FIG. 8A, the angle between X and 83d is smaller than the angle between X and 83c, so W would be set to 83d.
9. Let Z be the intersection of W and X. In FIG. 8B Z=Q. If Z is already in L, add Z to the end of the list L and terminate the process. Otherwise, add Z to the end of the list L, and go to the next step.
10. Set X to be the segment that starts with Z and ends with the end point of W. Repeat, starting with step 2 and using segment 86, having its beginning point at point Q and its ending point at point C, as the starting segment.

An apparatus for creating a moving haven boundary as described above is illustrated in FIG. 8C. The line segments and waypoints of the voyage plan are coupled to a polygonal line generator 90, wherein the line segments of the voyage plan (vectors between waypoints) are assembled and processed as described above, with reference to FIG. 8A, to provide a polygonal line representative of the voyage plan. These voyage plan line segments are coupled to a rectangle generator 92 wherein line segments (vectors) that form the rectangles about respective line segments of the voyage plan polygonal line are determined. Line segments intersecting at waypoints requiring arcs are coupled to arc generator 94 wherein arc line segments are established to approximate required arcs between the intersecting line segments to complete the boundary polygonal line. Rectangle line segments and arc line segments are coupled to a segment combiner 96 of a boundary generator 98. Segment combiner 96 combines the rectangle line segments and arc line segments to establish a set of line segments which are coupled to start line selector 102. A start line segment is selected by the start line selector 102 which is coupled to an intersect segment selector 104 wherein a second line segment is selected that intersects the start line segment in accordance with the selection procedure previously described. The second line segment is coupled to a repeat generator 106 which designates it as a start line and causes the intersect selector 104 to select a third line from the set of line segments that intersects the second line segment in accordance with the selection criteria. The process is continued until all line segments in the set of line segments have been used. The moving haven boundary is then completed and a buffer generator 105 is activated to establish a buffer between the moving haven and the moving haven boundary.

Still referring to FIG. 8C; the start line selector 102 may comprise a segment selector 108 wherein line segments in the segment combiner 96 that are entirely on or have a beginning on the moving haven boundary are selected. These selected line segments are coupled to a segment locator 110 wherein those line segments having start points at a position that is predetermined are identified and coupled to a direction determinator 112. Should more than one line segment originate at the predetermined position, the direction determinator 112 selects the one that points mostly in a predetermined direction, this direction may be "up", as previously mentioned.

Once the moving haven boundary has been determined the moving haven buffer is calculated.

An overview for calculating the moving haven buffer has been previously discussed. The primary differences in applying the simple shapes for the determination of the buffer and applying the simple shapes to the determination of the moving haven boundary. are:

A) For determining the buffer, the input polygonal line is the geometry of the moving haven boundary, rather than the voyage plan. The value used for the width is twice the buffer width, rather than the moving haven width.

B) The input polygon for arc generator 61 (FIG. 3) must be altered. Specifically, a vertex must be added to the end of the input polygonal line that has the same coordinates of the second vertex of the moving haven boundary.

C) The rectangle generator only generates the portion of each buffer rectangle that is within the moving haven boundary. Also the arc generator only generates arcs within the boundary.

D) A different method must be used for determining the starting segment input to the boundary generator.

In determining the moving haven boundary, there is no need to draw an arc around the first or last vertex of the input polygon. Because the buffer is a closed polygon, it is necessary to draw an arc around each vertex. Rather than modifying the arc generator 61 (FIG. 3) when creating the buffer, the input polygon is altered by adding a vertex to the end of the input polygonal line that has the same coordinates as the second vertex of the moving haven boundary. By adding the second vertex of the moving haven boundary to the end of the input polygonal line, the actual end point of the boundary is no longer the last point of the input polygonal line. As a consequence an appropriate arc will be drawn for each vertex of the unaltered input polygonal line.

The buffer, by definition, will never extend outside the moving haven boundary. As a consequence, any portion of any segments created by the arc or rectangle generators that are outside the boundary will never be a part of the final buffer geometry. To reduce the number of segments that the boundary generator processes, the arc generator only creates segments for arcs that are within the moving haven boundary and the rectangle generator only creates the portion of the buffer rectangle that is within the moving haven boundary, as shown in FIGS. 2A and 2B and described in the text relating thereto.

The method for finding the start segment to be used as input for the boundary generator 79 (FIG. 3) that was used for the moving haven boundary is not appropriate for the generation of the buffer. To establish the polygonal line for the buffer having segments 91a, 91b, 91c, and 91d, illustrated in FIG. 9, the following sequence of steps may be performed by a buffer generator 80 (FIG. 3):

1) Let R be the set of segments used as inputs into the boundary generator 79 (FIG. 3). R includes the segments 91a, 91b, 91c, and 91d.
2) Find a segment in R that is as least as long as all other segments in R. Segment 91a meets this criteria.
3) Find the center of 91a and label it C, so that 91a comprises two segments 93a, terminating at C, and 93b, originating at C.
4) Replace segment 91a with segments 93a and 93b.
5) Use 93b as the starting segment for the buffer bounder generation in boundary generator 79.
6) Modify the set R so it includes segments 93b, 91b, 91c, 91d, and 93a.

Refer now to FIG. 10, wherein a block diagram of a buffer polygonal line generator that may be utilized for the buffer generator 80 of FIG. 8C is shown. The boundary polygonal line is coupled to a buffer rectangle generator 114 wherein rectangles which may be used for generating the buffer polygonal line are generated. These rectangles have widths that are twice the desired buffer width, lengths that are equal to the distance between vertices of the boundary polygonal line, and are centered on the boundary polygonal line. Rectangles generated by the rectangle generator are coupled to a buffer arc generator 119, wherein the rectangles are coupled to a first vector generator 116 and a second vector generator 118. The first vector generator establishes a vector between a vertex of an end edge of a buffer rectangle and the point at which the end edge intersects the moving haven boundary. The second vector generator establishes a vector between the end point of the leading edge of the next adjacent buffer rectangle and the point at which that leading edge intersects the moving haven boundary. These vectors are of equal length and their points of intersection coincide as shown at point 48 in FIG. 2A. Vectors so established are coupled to an angle determinator 120 wherein the angle between the first and second vectors are determined. Once the angle between the first and second vectors is determined, the first vector and the angle between the first and second vectors are coupled to a vector rotator 122 wherein the first vector is rotated through selected angular increments until the entire angle between the first and second vectors has been traversed. The vectors resulting from the rotations and the first and second vectors are coupled to an end point locator 124 wherein the vector end points are determined. These end points are then coupled to a buffer polygonal line generator wherein they are connected to approximate an arc which is incorporated into the buffer polygonal line.

While the invention has been described in its preferred embodiments, it is to understood that the words that have been used are words of description rather than limitation and that changes may be made within the purview of the appended claims without departing from the true scope and spirit of the invention in its broader aspects.

I claim:

1. A method for generating a moving haven boundary along a voyage plan comprising the steps of:
    establishing a width for said moving haven boundary;
    creating rectangles centered on said voyage plan, said rectangles having edges separated by said width and lengths equal to lengths of strait line portions of said voyage plan; and
    determining pie shaped areas between rectangles at waypoints of said voyage plan, each of said pie shaped areas having an arc centered at a waypoint and extending between vertices of rectangles on either side of said waypoint,
    establishing said moving haven boundary with a polygonal line comprising said edges and said arcs.

2. A method in accordance with claim 1 wherein said creating rectangles step includes the steps of:
    establishing a first rectangle having said width and a length substantially equal to said specified distance;
    establishing subsequent rectangles between adjacent waypoints, said rectangles having said width and lengths substantially equal to distances between said adjacent waypoints; and
    establishing a last rectangle between said end point and a last waypoint.

3. A method in accordance with claim 1 wherein said arcs are approximated with the steps of:
    establishing a first vector between said given waypoint and a vertex of a rectangle terminating at said given waypoint;
    noting said vertex of said terminating rectangle as an end point of said first vector;
    establishing a second vector between said given waypoint and a vertex of a rectangle originating at said given waypoint;
    noting said vertex of said originating rectangle as an end point of said second vector;
    determining angular distance between said first and second vectors;
    rotating said first vector by a selected angle to establish a third vector;
    noting an end point of said third vector;
    repeating rotations of a vector established by a previous rotation by said selected angle until said angular distance between said first and second vectors has been traversed;
    noting end points of vectors determined by said repeating rotations; and
    connecting said end points in a sequential manner to approximate said arcs.

4. A method in accordance with claim 1 further including the steps of:
    forming buffer rectangles centered on said boundary having widths equal to twice a selected distance from said boundary and lengths equal to distances between vertices of said boundary;
    forming buffer arcs between vertices of said buffer edges, said buffer edges and said buffer arcs establishing polygonal lines internal and external to said boundary; and
    selecting said internal polygonal lines as a buffer boundary.

5. A method in accordance with claim 4 wherein said forming buffer arcs step includes the steps of:
    establishing a first vector between a vertex of an end edge of a selected buffer rectangle and a point at which said end edge intersects said moving haven boundary;
    noting said vertex of said selected buffer rectangle as an end point of said first vector;
    establishing a second vector between a vertex of a leading edge of a buffer rectangle next adjacent to said selected buffer rectangle and a point at which said leading edge of said next adjacent rectangle intersects said boundary;
    noting said vertex of said next adjacent rectangle as an end point of said second vector;
    determining angular distance between said first and second vectors;
    rotating said first vector by a selected angle to establish a third vector;
    noting an end point of said third vector;
    repeating rotations of a vector established by a previous rotation by said selected angle until said angular distance between said first and second vectors has been traversed;
    noting end points of vectors determined by said repeating rotations; and
    connecting said end points in a sequential manner to approximate said arcs.

6. A method for generating a moving haven boundary along a voyage plan comprising the steps of:
    establishing an ordered list of points representing a polygonal line, said polygonal line indicative of said voyage plan;
    providing a width of said moving haven boundary;
    generating sets of line segments between said points, each set establishing a rectangle having said width and a length determined by a distance between adjacent points;
    determining intersecting line segments of adjacent rectangles;
    creating arcs between said intersecting line segments about obtuse angles at waypoints of said polygonal line; and
    forming said moving haven boundary utilizing said arcs and line segments of said rectangles.

7. A method in accordance with claim 6 wherein said creating arcs step includes the steps of:
    establishing a first vector along a first line segment of first and second intersecting line segments;
    establishing a second vector along said second line segment;
    determining angular distance between said first and second vectors;
    rotating said first vector by a selected angle to establish a third vector;

repeating rotations of a vector established by a previous rotation by said selected angle until said angular distance between said first and second vectors has been traversed; and connecting end points of said first, second, and third vectors and all vectors created by said repeating rotations in to establish arc representative line segments.

8. A method in accordance with claim 7 wherein said forming step includes the steps of:

combining said line segments and said arc representative line segments to provide a set of combined line segments;

identifying a starting line segment from said set of combined line segments, said starting line segment having a starting point and an ending point;

selecting a line segment intersecting said starting line segment in accordance with a predetermined selection criteria, thereby providing a selected line segment;

eliminating all line segments intersecting said starting segment other than said selected line segment;

repeating said selecting step using said selected line segment as said starting line segment until all line segments have been selected.

9. A method in accordance with claim 8 wherein said identifying step includes the steps of:

selecting line segments in said set of combined line segments that are entirely on or have a beginning on said moving haven boundary, thereby establishing an acceptable set of starting line segments;

locating line segments in said acceptable set that have start points at a preselected position in said moving haven, thereby providing a set of possible starting line segments, should only one such line segment be in said acceptable set, this line segment is chosen as a starting segment; and choosing a line segment in said set of possible starting line segments that points mostly in a predetermined direction, should more than one line segment be in said acceptable set.

10. A method in accordance with claim 8 wherein said selecting step includes the steps:

finding all line segments intersecting said starting line segment, thereby establishing a set of intersecting line segments;

dropping all line segments in said set of intersecting line segments touching said starting point of said starting line;

eliminating all line segments in said set of intersecting line segments that do not result in a turn of a predetermined direction;

determining points of intersection with said starting line segment of line segments remaining in said set of intersecting line segments;

finding a point of intersection that is closest to said starting point of said starting line, thereby establishing a closest point of intersection;

eliminating all line segments that do not include said closest point of intersection;

selecting, from line segments remaining in said set of intersecting line segments a line, a line segment having a turn angle in said predetermined direction that is smaller than turn angles of all other line segments remaining in said set of intersecting line segments.

11. A method in accordance with claim 6 wherein said creating arcs step includes the steps of:

establishing a first vector along a first line segment;

establishing a second vector along a line segment intersecting said first line segment;

determining angular distance between said first and second vectors;

rotating said first vector by a selected angle to establish a third vector;

repeating rotations of a vector established by a previous rotation by said selected angle until said angular distance between said first and second vectors has been traversed;

connecting end points of said first, second, and third vectors and all vectors created by said repeating rotations in a sequential manner to establish arc representative line segments; and including said arc representative line segments in said set of combined line segments.

12. A method in accordance with claim 6 further including the step of:

generating a buffer within said moving haven boundary having an outer buffer boundary at a selected distance from said moving haven boundary.

13. A method in accordance with claim 12 wherein said generating step includes the steps of:

constructing buffer rectangles centered on said moving haven boundary having widths equal to twice said selected distance and lengths equal to distances between corners and arcs of said moving haven boundary;

creating buffer arcs between said buffer edges of said buffer rectangles on either side of waypoints of said voyage plan, said buffer edges and said buffer arcs establishing polygonal lines internal and external to said boundary; and selecting said internal polygonal lines as said buffer boundary.

14. A method in accordance with claim 13 wherein said creating buffer arcs step includes the steps of:

establishing a first vector between a vertex of an end edge of a selected buffer rectangle and a point at which said end edge intersects said moving haven boundary;

noting said vertex of said selected buffer rectangle as an end point of said first vector;

establishing a second vector between a vertex of a leading edge of a buffer rectangle next adjacent to said selected buffer rectangle and a point at which a leading edge of said next adjacent rectangle intersects said moving haven boundary;

noting said vertex of said next adjacent rectangle as an end point of said second vector;

determining angular distance between said first and second vectors;

rotating said first vector by a selected angle to establish a third vector;

noting an end point of said third vector;

repeating rotations of a vector established by a previous rotation by said selected angle until said angular distance between said first and second vectors has been traversed;

noting end points of vectors determined by said repeating rotations; and connecting said end points in a sequential manner to approximate said arcs.

15. A method in accordance with claim 13 wherein said constructing step includes buffer start segment determining steps of:

selecting a line segment that is as least as long as all other line segments, thereby providing a selected line segment;

finding a center of said selected line segment, thereby establishing a first and second line segments, a first originating at said center and a second ending at said center; and choosing one of said first and second line segments as said buffer start segment.

16. An apparatus for providing a moving haven boundary along a voyage plan comprising:

generator means for generating a polygonal line having line segments and waypoints of said voyage plan;

rectangle means coupled to said generator means for establishing rectangle line segments of rectangles along respective segments of said polygonal line, each rectangle centered on said polygonal line of said voyage plan, having a width equal to a preselected width of said moving haven and a length equal to its respective line segment length;

arc means coupled to said rectangle means for providing an arc between a trailing edge of a first rectangle and a leading edge of a second rectangle at a selected waypoint, said leading and trailing edges intersecting at said selected waypoint, said arc being represented by a series of arc line segments and formed about an obtuse angle formed by said polygonal line at said selected waypoint; and boundary means coupled to said rectangle means and said arc means for generating said moving haven boundary.

17. An apparatus in accordance with claim 16 where said boundary means includes:

segment means coupled to said rectangle means and said arc means for combining said rectangle line segments and said arc line segments, thereby establishing a set of line segments;

start means coupled to said segment means for selecting a starting line segment from said set of line segments;

intersect means coupled to said start means and said segment means for selecting a line segment intersecting said starting line segment in accordance with a predetermined selection criteria, thereby selecting a second line segment; and repeat means coupled to said intersect means and said segment means for designating said second line segment to said intersect means as a starting line segment and selecting a further line segment in accordance with said predetermined selection criteria and thereafter utilizing said further line segment as a starting line segment until all line segments in said segment means have been utilized.

18. An apparatus in accordance with claim 17 wherein said start means includes:

selector means coupled to said segment means for selecting line segments from said set of line segments that are entirely on or have a beginning on said moving haven boundary, thereby providing an acceptable starting line set;

locator means coupled to said selector means for providing line segments in said acceptable starting line set having a starting point at a preselected position, thereby providing a set of possible starting line segments; and choice means coupled to said locator means for choosing a line segment in said set of possible starting line segments that points mostly in a predetermined direction.

19. An apparatus in accordance with claim 16 further including:

buffer rectangle means coupled to said boundary means for generating rectangles about said boundary polygonal line;

buffer arc means coupled to said buffer rectangle means for generating arcs between end edges of first rectangles and leading edges of second rectangles; and buffer polygonal line means coupled to said buffer rectangle means and said buffer arc means for utilizing said rectangles and said arcs to establish a buffer polygonal line within said moving haven boundary.

20. An apparatus in accordance with claim 19 wherein said buffer arc means includes;

first vector means coupled to said buffer rectangle means for converting said end edges to first vectors;

second vector means coupled to said buffer rectangle means for converting said leading edges to second vectors;

angle means coupled to receive said first and second vectors for determining angles between corresponding first and second vectors;

rotator means coupled to receive said first vectors and said angles between corresponding first and second vectors for rotating said first vectors by preselected angular increments until said angles have been traversed; and end point means coupled to receive rotated vectors for noting end points of vectors at each angular increment and coupling said end points to said buffer polygonal line said end points and said rectangles are utilized to establish said buffer polygonal line within said moving haven boundary.

* * * * *